United States Patent [19]
Mochida et al.

[11] Patent Number: 4,492,959
[45] Date of Patent: Jan. 8, 1985

[54] KEYLESS ENTRY SYSTEM FOR AN AUTOMOTIVE VEHICLE

[75] Inventors: Haruo Mochida, Yokohama; Hiroshi Nakakooji, Zama; Hirotoshi Namazue, Yokohama, all of Japan

[73] Assignees: Nissan Motor Company, Limited; Kokusan Kinzoku Kogyo Co., Ltd., both of Japan

[21] Appl. No.: 391,343

[22] Filed: Jun. 23, 1982

[30] Foreign Application Priority Data

Jun. 24, 1981 [JP] Japan ................................ 56-96753
Jun. 24, 1981 [JP] Japan ................................ 56-96754

[51] Int. Cl.[3] ........................ E05B 49/00; H04Q 9/00
[52] U.S. Cl. ................................ 340/825.56; 361/172
[58] Field of Search ...................... 340/825.31, 825.56, 340/63; 361/172; 235/382; 307/10 AT

[56] References Cited

U.S. PATENT DOCUMENTS 4,148,092 4/1979 Martin ................................ 361/172
4,205,325 5/1980 Haygood et al. .
4,206,491 6/1980 Ligman et al. ...................... 361/172

*Primary Examiner*—Donald J. Yusko
*Attorney, Agent, or Firm*—Lowe, King, Price & Becker

[57] ABSTRACT

There is provided a keyless entry system in which a permanent code, or first code, and a user's code, or second code are used. The second code is presettable in conjunction with use of the first code. When the first code is inputted, the system gets ready for presetting a desired number of code elements consituting the second code. According to the invention, the system is provided with a circuit for variably presetting the number of the code elements, which circuit is responsive to the first code to vary the presetted number of the second code elements to that inputted following to the input of the first code. Preferably, the keyless entry system further includes a theft prevention circuit which inhibits input of a code for a given period of time when wrong codes are inputted more than a predetermined number of times.

14 Claims, 4 Drawing Figures

KEYLESS ENTRY SYSTEM FOR AN AUTOMOTIVE VEHICLE

BACKGROUND OF THE INVENTION

The present invention relates generally to a keyless entry system for locking and unlocking an automotive vehicle door in use with a preset code inputted by pushing push buttons on the door, instead of using a key. More particularly, the invention relates to a keyless entry system which has a variable number of code elements of the preset code.

U.S. Pat. No. 4,205,325, issued on May 27, 1980, to Haygood et al shows a keyless entry system for locking and unlocking a vehicle door lock mechanism. In Haygood et al, several functions are incorporated in a single keyless entry system for an automotive vehicle. Major improved features include a permanent preprogrammed code storage memory and a user programmable code storage memory, wherein either code may be inserted into the system to gain entry into the vehicle and enable the other functions. The other functions include the ability to unlock one or several doors of the vehicle, retract a roof-window, unlock a deck lid, lower selected side windows, reprogram a new user selected code into the programmable memory or disable the system response to the user selected code. These functions have been found to be highly desirable since they can be controlled to occur prior to entering the vehicle.

Five digit designated pushbutton keyboards on opposite vehicle doors are shown in the preferred embodiment, as the means by which all predetermined codes are manually entered into the system. A primary keyboard mounted on the left front (driver's) door is designated by the system to have continual override priority over the keyboard mounted on the right front (passenger's) door. However, each keyboard has an independent operational capability to allow a user to enter correct digit codes and to have the system perform the aforementioned functions.

In operation of Haygood et al, a depression of any pushbutton on either keyboard will cause illumination of the keyboard, activation of the system, and may also cause illumination of the vehicle interior for a predetermined period of time. In this manner, the system is visible for night operation and activated to receive a multi-digit code which corresponds to either the permanent preprogrammed code or a programmed user selected code. The user then depresses a sequence of digitally designated pushbuttons and each depression commences a new time period for illumination and activation. In order to eliminate excessive battery drain, the system will deactivate and illumination will terminate if the user hesitates longer than the predetermined time period. When proper entry of either the permanent or user selected multi-digit code is made, the door upon which the particular keyboard is mounted will immediately unlock and allow entry to the passenger compartment of the vehicle. Subsequently, while the system remains activated during the aforementioned time period, predetermined digital pushbuttons may be depressed to unlock all the other vehicle doors, unlock, the deck lid, retract a roof-window, lower the side windows, program a new user selected code into the programmable memory, or disable the system response to the last programmed user selected code.

In the particular point of the present invention, the keyless entry system is to permit a change in the individual numbers constituting the combination code, referred to hereinafter as a user's code or a second code, when utilizing a permanent code known only by the owner, referred to hereinafter as a first code. In the usual use, the vehicle door lock mechanism, the trunk lid locking mechanism and other vehicle equipment are operated using only the second code. As will be understood, the numbers of possible combinations of individual numbers constituting the code (hereinafter referred to as the code elements) is determined depending on the number of code elements to be combined. For example, assuming each code element is selected from 10 figures, e.g., 0 to 9, and four code elements are combined to constitute the code, the number of possible combinations is $10^4=10{,}000$. If the code element is to be selected from 5 figures and six code elements are to be combined, the number of possible combinations become $5^6=15{,}625$. Increasing the number of figures to be selected as code elements increases the space required. In turn, increasing the number of code elements increases the difficulty of memorizing and remembering the preset code. According to the present system, the preset code can be changed with respect to either the combination of code elements or the number of code elements by input means on the exterior of the vehicle without requiring special operations.

Another particular point of the present invention is that the unlocking of the door and/or trunk lid can be performed only by inputting the second code. The second code can be changed in use with the first code in such a matter that the first code is inputted in advance of changing the second code to condition the system for changing the second code. The second code may be selected at the convenience of the user. In the prior art system, unlocking the door and/or trunk lid can be performed by either of the first and second codes. Namely, unlocking can be done by two different combinations resulting in reducing security by about a half in comparison with the system using a single code. According to the present system, a circuit is provided for distinguishing the inputted code being the first code or second code.

SUMMARY OF THE INVENTION

Therefore, it is an object of the present invention to provide a keyless entry system which allows change in the number of code elements forming a user's code in use with a permanent code.

Another object of the present invention is to provide a theft prevention circuit in the keyless entry.

According to the present invention, there is provided a keyless entry system in which a permanent code or first code, and a user's code or second code are used. The second code is presettable in use with the first code. In other words, when the first code is inputted, the system gets ready for presetting a desired number of code elements constituting the second code. According to the particular point of the invention, the system is provided with a circuit for variably presetting the number of the code elements, which circuit is responsive to the first code to vary the presetted number of the code elements with that inputted following to the input of the first code.

Preferably, the keyless entry system further includes a theft prevention circuit which inhibits input of a code for a given period of time when wrong codes are inputted more than a predetermined number of times.

BRIEF DESCRIPTION OF THE DRAWINGS

The present invention will be understood more fully from the detailed description given hereinbelow and from the accompanying drawings of the preferred embodiments of the invention, which, however, should not be taken as limitative to the invention but for elucidation and explanation only.

In the drawings.

DESCRIPTION OF THE PREFERRED EMBODIMENT

Figure 1:
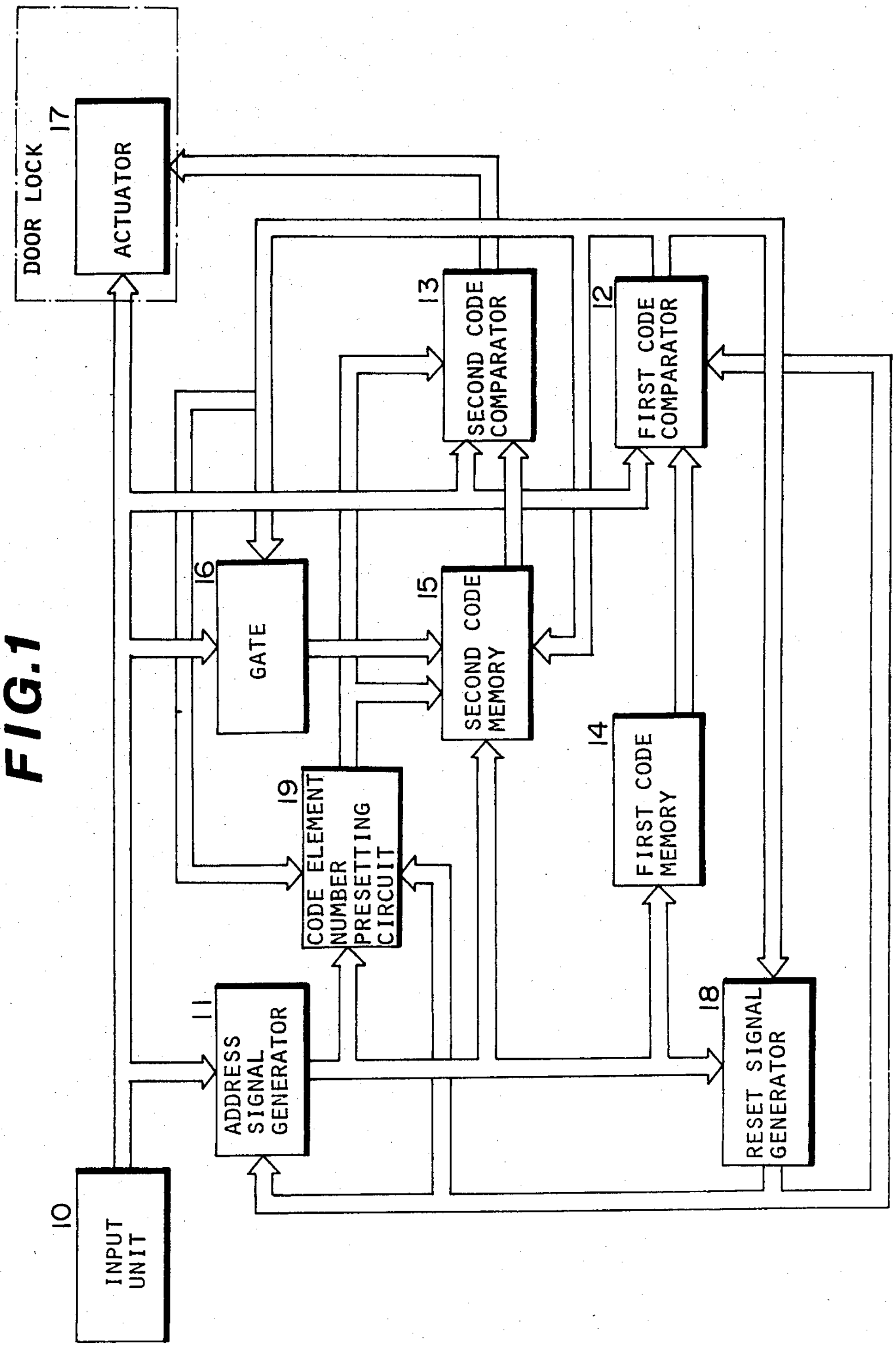
FIG. 1 is a schematic block diagram of the preferred embodiment of a keyless entry system according to the present invention.

Referring now to the drawings, particularly to FIG. 1, there is illustrated the preferred embodiment of a keyless entry system according to the present invention. In principle, the keyless entry system of the present invention is operated using plural code groups which consist of a first permanent code and a second user's code. The permanent code is preset in the system and is a fixed code and can not be changed by the operator. The user's code is used for unlocking the vehicle door, opening the vehicle window, unlocking the trunk lid and so forth. The user's code is changeable in use with the first code.

Both of the first and second codes are inputted using an input unit 10 which is generally equipped on an external door handle or other appropriate portion of the outer surface of the vehicle for operation thereof. The input unit 10 has a plurality of push buttons for inputting each code digit or element of the first or second codes. The input unit 10 is adapted to output a code element signal indicative of the inputted code element and corresponding to the depressed push button. The code element signal is fed to an address signal generator 11, a first code comparator 12, a second code comparator 13 and a gate 16. The address signal generator 11 includes a counter for counting up the code element signals inputted thereto. The address signal generator 11 produces an address signal representative of address to be accessed and corresponding to the counted value of the counter. The address signal is fed to a first code memory 14, a second code memory 15, a reset signal generator 18 and a code element number presetting circuit 19. The first code memory 14 is preset with the first permanent code, in which each of a number of code elements is stored in a memory address corresponding to the order of the first code. Likewise, the second code memory 15 stores the presetted second code, in which each of a number of code elements is stored in the memory address corresponding to the order of the second code.

By the address signal fed from the address signal generator 11, each of the memory address in the first code memory is accessed and the stored code element therein is read out. The read out code element is fed to the first code comparator 12 to be compared with the inputted code element. Likewise, each memory address of the second code memory 15 is accessed by the address signal and the stored value indicative of the preset second code element is read out. The read out value is outputted to the second code comparator 13 to be compared with the inputted code element.

In the operation of the embodiment shown, the comparing operation of the first code with the inputted code is performed prior to the comparing operation of the second code. If the inputted code is the first code, then the first code comparator 12 produces a second code presetting signal to be fed to the gate 16 and to the code element number presetting circuit 19. The second code presetting signal is also fed to the reset signal generator 18 to make the latter operative to produce a reset signal at a given timing. The reset signal is fed to the counter in the address signal generator 11 to clear the counter value thereof.

The gate 16 is opened in response to the second code presetting signal fed from the first code comparator 12. At this point, the system is ready for changing the preset code in the second code memory 15 by sequentially inputting several digits of code elements consisting of the desired or preferred second code. Similar to the foregoing, the inputted new second code elements from the input unit 10 are fed to the address signal generator 11 as code element signals. According to the input of the code element signals, the address signal generator 11 produces the address signal. The address signal is fed to the code number presetting circuit 19. The code number presetting circuit 19 is responsive to the second code presetting signal to count up the number of the inputted address signal. The code element number presetting circuit 19 stops its counting operation when the interval between the address signals inputted thereto is longer than a given period of time. The stored value of the number of the address signals counted then becomes the preset number of the second code elements. The code number presetting circuit 19 then feeds the address signal to the second code memory 15 to store zero values for the unused digits up to the maximum value seven to form the new code elements. The second code memory 15 is responsive to the address signal fed from the code number presetting circuit 19 to read in the inputted new code elements for re-presetting the second code.

When the inputted code is not the first code but is the second code, the gate 16 is maintained at the closed position to block the inputted code element signals from being inputted to the second code memory 15. Thus, according to the address signal, the stored code elements in the second code memory 15 are read out and fed to the second code comparator 13. The second code comparator 13 produces an actuation signal to activate an actuator 17 for unlocking the door lock, operating the window regulator for opening for unlocking the trunk lid, when the inputted code matches with the second code.

Although the system illustrated in FIG. 1 has only one actuator for door unlocking, it may be possible to provide a plurality of actuators for various operations, e.g., door unlocking, window opening and unlocking the trunk lid. In the case a plurality of actuators are utilized, some of the push buttons in the input unit 10 will serve as function keys for performing desired operations. In this case, the function keys are depressed following inputting of the second code.

Figure 2:
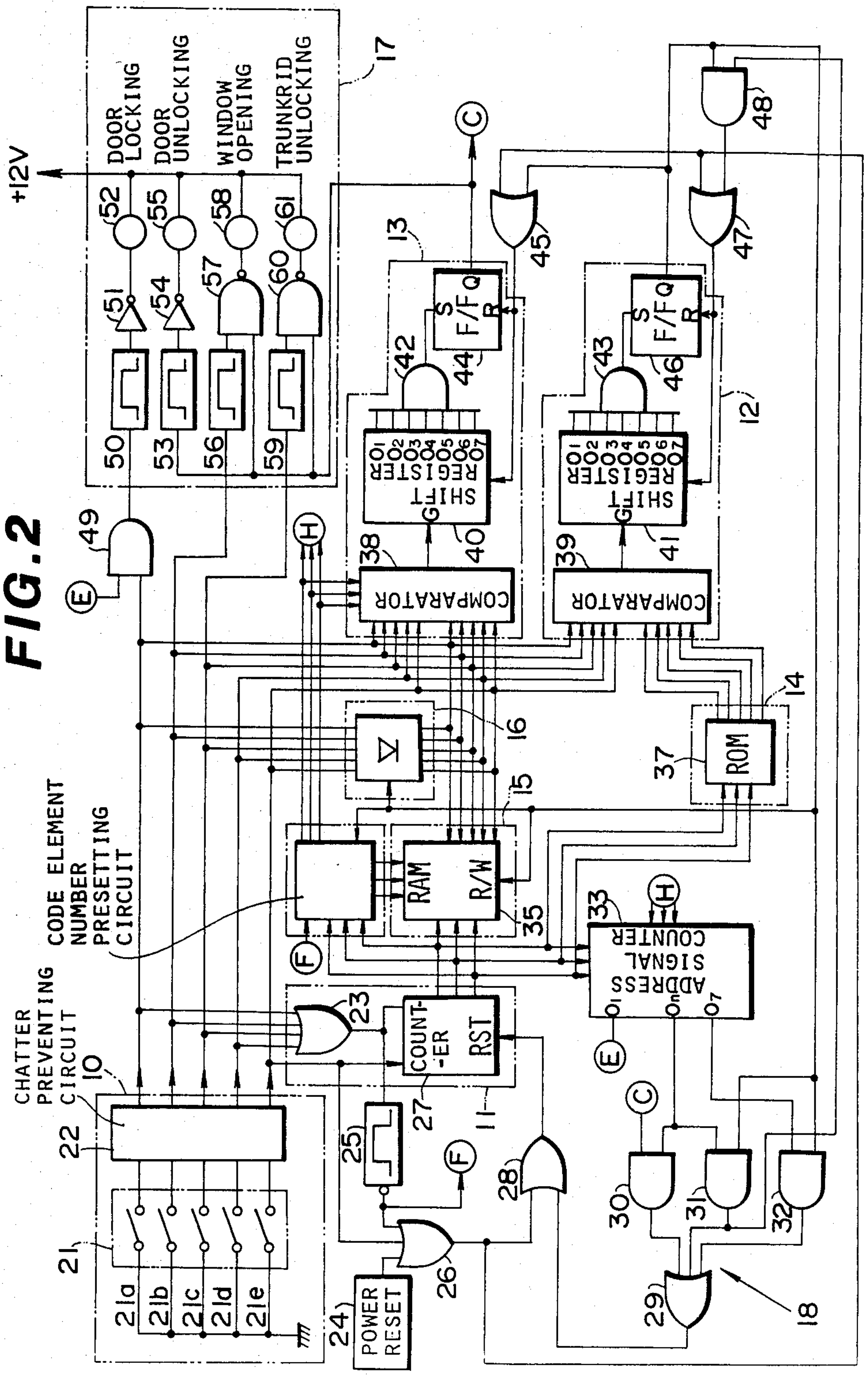
FIG. 2 is a circuit diagram of the keyless entry system of FIG. 1.

FIG. 2 shows a detailed circuit construction of the preferred embodiment of the keyless entry system of FIG. 1. In FIG. 2, the input section 10 comprises a plurality of push button 21*a* to 21*e* for inputting the code elements. If necessary, it is possible to provide another push button serving as a start button for initializing the system including resetting the system. The start button also functions to manually clear the code inputted when it includes a wrong code element. The start button is further used for stopping the actuator which moves the windows up and down.

A chatter prevention or anti-bounce circuit 22 produces a high level output to be fed to the OR gate 23. The OR gate 23 outputs an OR signal indicative of the order of the inputted code element in the combination of the code elements. The OR signal is used to store the data signal $S_d$ in RAM 35. The push buttons are, in turn, grounded.

The OR signal from the OR gate 23 is applied to a retriggerable one-shot monostable multivibrator 25. This one-shot monostable multivibrator 25 is provided to reset the whole system via an OR gate 26 by outputting a signal if none of the push-button switches have been depressed for a predetermined period of time, e.g., five seconds.

The code element signals from the input unit 10 are also applied to an address counter 27 of the address signal generator 11 via the OR gate 23. Although the address counter 27 has both an UP terminal and a DOWN terminal, the output terminal of the OR gate 23 is connected solely to the UP terminal. The address counter 27 is adapted to produce address signals respectively representative of the counter value thereof and corresponding to respective memory addresses in a random-access memory (RAM) 35 which is used as the second code memory 15 in FIG. 1 and a programmable read-only memory (PROM) 37 used as the as first code memory 14 in FIG. 1. Therefore, whenever one of the push-button switches 21*a* to 21*e* is depressed, the counter value of address counter 27 is incremented. The output lines of the address counter 27 are connected to the address input terminals of the RAM 35 of the second code memory 15 and the PROM 37 of the first code memory 14. The address signals of the address counter 27 are respectively representative of the memory addresses of the RAM 35 and the PROM 37 to be accessed. The code element data stored in RAM 35 and the PROM 37 are read out from the corresponding addresses to provide first and second code element signals respectively indicative of the stored value in respective accessed addresses. The first and second code element signals from the PROM 37 and the RAM 35 are applied to a comparator 39 in the first code comparator 12 and a comparator 38 in the second code comparator 13, respectively. Also applied to these comparators 39 and 38 are the code element signals outputted by the input unit 10 by depressing of the buttons 21*a*–21*e*. Therefore, the comparator 39 consecutively compares each first code element inputted via the push-buttons 21*a*–21*e* with the corresponding stored first code element in the corresponding address of the PROM 37. The comparator 38 consecutively compares each second code element inputted via the push-buttons with the corresponding stored second code element in the RAM 35.

When the input unit 10 is operated to input a code, the code element signals are applied to the address counter 27, via the OR gate 23. The address signals thus produced are applied to the PROM 37 to read out the storaged values in respectively corresponding memory addresses thereof. The read out values of the PROM 37 are respectively outputted to the comparator 39. As stated, the comparator 39 thus receives the code element signals from the input unit 10 and the stored first code element signals from the PROM 37 to compare corresponding digits of each code.

In practice, the first code consists of, for example, seven code elements (digits). The comparator 39 produces a comparator output when the compared inputted code element or elements matches with the first code element or elements compared therewith. The comparator outputs are applied to an input terminal G of a shift register 41. The reset terminal of the shift register 41 is, in turn, connected to the theft preventing circuit consisting of monostable multivibrator 25 via OR gates 26 and 47. The theft preventing circuit produces a reset signal when the interval between input elements of the code in the push buttons 21*a*–21*e* is longer than the predetermined length. The reset signal is fed to the reset terminal of the shift register 41 via the OR gates 26 and 47 to reset the shift register. The reset signal is also applied to a reset terminal of a resetting flip-flop 46.

The shift register 41 has output terminals $o_1$–$o_7$ respectively corresponding to digits of the code element. The shift register 41 produces outputs through respective output terminals $o_1$–$o_7$ corresponding to respective digits being compared in the comparator 39. In practice, a high level signal can be inputted and shifted one position in the shift register each time an equality is determined by a comparator output signal from comparator 39. The output terminals $o_1$–$o_7$ are connected to an AND gate 43. The AND gate 43 produces an AND signal when all of the output terminals $o_1$–$o_7$ produce outputs (high level signals). The AND signal is applied to the set terminal of the resetting flip-flop 46. When the flip flop 46 is set, the signal of the flip-flop 46 is fed to the gate 48 and the code element number presetting circuit 19. The code element number presetting circuit 19 is responsive to the flip-flop signal which serves as the second code presetting signal, to count up the number of address signals inputted thereto. On the other hand, the gate 16 is responsive to the second code presetting signal to open the gate. By opening the gate, the RAM 35 as the second code memory 13 receives the inputted code elements in the input unit 10 via the gate 16. At the same time, the second code presetting signal is also applied to the read/write terminal of the RAM 35 to permit writing into the memory.

Figure 3:
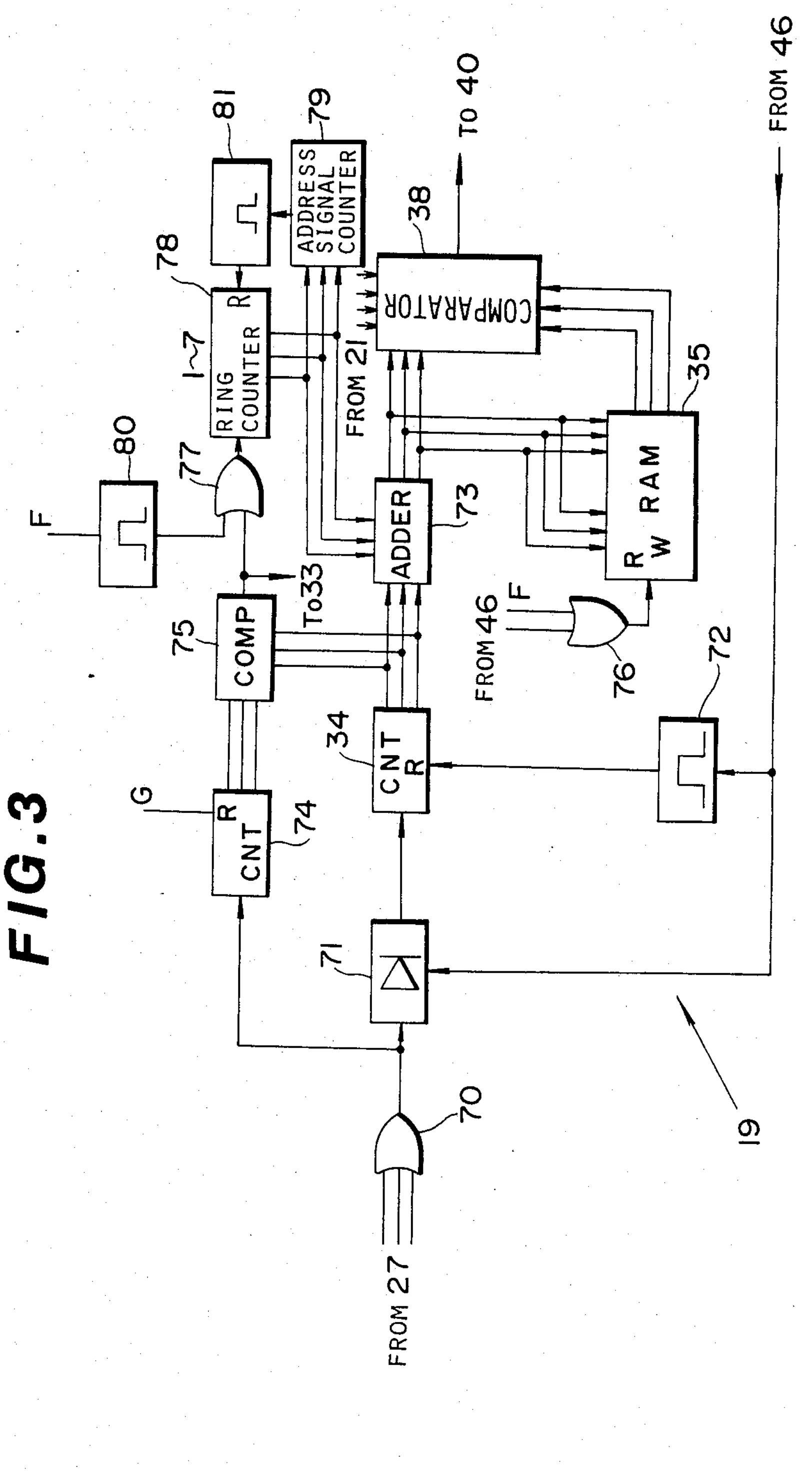
FIG. 3 is a circuit diagram of a code element number presetting circuit in the keyless entry system of FIG. 2.

Referring to FIG. 3, there is illustrated in detail the code element number presetting circuit 19. The code element number presetting circuit 19 includes an AND gate 70 connected to the address counter 27 of FIG. 2. The OR gate 70 is responsive to output an OR signal to be fed to an element number counter 34 via a gate 71. The gate 71 is connected to the flip-flop 46 and responsive to the flip-flop set signal to open the gate. The element number counter 34 is resetted each time upon receiving an output from a one-shot monostable multivibrator 72 which is responsive to raising of the set signal of the flip-flop 46. The OR gate 70 feeds the output thereof to a counter 74. The counter 74 counts up the OR gate outputs. The counter 74 produces a counter signal indicative of the counter value thereof and feeds the same to a comparator 75. A counter signal representative of the counter value in the element number counter 34 is also inputted to the comparator 75. The comparator 75 compares both of the counter values. At the same time, the counter signal of the element number counter 34 is fed to an adder 73. The adder 73 produces an adder signal indicative of the content therein and feeds this signal to an address input and a memory input of the RAM 35. The adder signal of the adder 73 is also fed to a comparator 38.

The read/write terminal of the RAM 35 is connected to the flip-flop 46 and the monostable multivibrator 25 of the delay circuit 18 to receive therefrom the flip-flop output and the reset signal. The RAM 35 is in the write mode while both of the inputs thereto are maintained at high level. The RAM feeds an output to the comparator 38 while the address signal is inputted thereto. The comparator output of the comparator 38 is fed to a shift register 40.

When the counter outputs of the counters 34 and 74 are matched together, the comparator 75 produces a comparator output to be fed to a ring counter 78 via the OR gate 77. The ring counter 78 feeds a signal indicative of values in a range 1 to 7 which is incremented by 1, to the comparator 38. At the same time the ring counter signal is fed to the RAM 35 to be stored therein. When the ring counter signal having a value 7, for example, is produced in the ring counter 78, the content in the ring counter 78 is resetted by the output of the address signal counter 79 via a one-shot monostable multivibrator 81.

On the other hand, the output of the monostable multivibrator 25 is fed to the OR gate 77 through a one-shot monostable multivibrator 80 and thus operates the ring counter to produce the ring counter signal. By this, the code element number is recorded in the element number counter 34 and ring counter 78 produces the ring counter signals respectively representative of the code element numbers remaining to the inputted second code element numbers. The ring counter signals are fed to the RAM 35 to access the memory addresses remaining to the inputted second code element numbers. Thereafter, the counter value in the counter 74 is resetted by an OR signal fed from the OR gate 28.

When writing the new second code into memory 35, the address counter 27 counts the number of digits of the code which may be variably selected by the operator (e.g., seven digits maximum), for example, a five code element may be selected. After the five digits are inputted, the reset signal is generated from the monostable multivibrator 25 which is fed to the presetting circuit 19 at terminal F. The presetting circuit 19 generates zeros for the code elements six and seven, and stores these zeros in the corresponding addresses for elements six and seven. In the read-out mode, the five digit code inputted via switches 21 is compared with the new code stored in memory 35, and the zeros for digits six and seven are addressed by the presetting circuit 19 and automatically form part of the code for use in comparator 38 and shift register 40. The seven outputs of shift register 40 are fed to the AND gate 42 to generate the second code match signal.

In operation of the code number presetting circuit 19, when the inputted code matches with the first code stored in the ROM 37, the flip-flop 46 is setted by the output of the AND gate 43. By the set signal of the flip-flop 46 is fed to the counters 27, 34 and 74 to reset therefor to initialize. The gate 36 and the 71 also receive the flip-flop set signal the open the gates. Following to input of the first code, code elements of the desired second code are inputted from the push buttons 21*a* to 21*e* of the input unit 10. The inputted code elements are fed to the RAM 35 to be stored therein and the number of the code elements is counted by the element number counter 34. After inputting the desired element numbers of the second code, the monostable multivibrator produces the reset signal with the given delay time. By the output of the monostable multivibrator 25, the one-shot monostable multivibrator 80 produces the output and the ring counter 78 is activated by the output of the gate 77. The ring counter signals as the ring counter 78 is activated are respectively representative of the number of code elements remaining of the inputted second code element number. The ring counter signals act as address signals to access the corresponding memory addresses in the RAM. The RAM 35 is responsive to the ring counter signals to store the ring counter signal values in the corresponding memory addresses. After the RAM 35 stores the last order of the code element, e.g., seventh code element, the code element number presetting circuit 19 is resetted. In this position, the element number counter 34 records the inputted second code element number therein.

When the inputted code is not the first code, the second code presetting signal is not produced. Therefore, the read/write terminal of the RAM 35 is conditioned for reading out the stored code. The stored code in the RAM 35 is read out in response to the address signal and fed to the comparator 38. Similarly to the foregoing comparator 39, the comparator 38 compares the inputted code element and the second code element read out from the RAM 35. The comparator 38 produces outputs whenever the compared inputted code element and the second code element match and an output is provided to the input terminal G of the shift register 40. The shift register 40 has seven output terminals $o_1$–$o_7$ respectively corresponding to the highest number of possible digits of the second code. The shift register 40 produces the outputs through the output terminals to an AND gate 42. When the output terminals $o_1$–$o_7$ are all high, the AND gate 42 produces an AND signal which is fed to a set terminal of the flip-flop 44. The theft preventing circuit 22 is connected to the reset terminal of the flip-flop 44 via OR gates 26 and 45. When the flip-flop 44 is set, the actuation signal is fed to the actuator 55 for unlocking the door, the actuator 58 for opening the window and the actuator 61 for unlocking the trunk lid.

At this time, the gate 71 is in a closed position. The comparator 75 compares the stored value in the element number counter 34 and the counter value in the counter 74. When the inputted code element number reaches the stored value in the element number counter 34, the comparator 75 produces the comparator signal to be fed to the ring counter 78 via the OR gate 77. The comparator output is also fed via the $O_n$ terminal of the address signal counter 33 to reset the address counter 27. At the same time, the ring counter 78 becomes operative to feed the ring counter signal to the adder 73 to produce the adder signal. The adder signal is fed to the RAM 35 and serves as an address signal to access the remaining memory addresses in the RAM. The adder signal from the adder 73 is also fed to the comparator 38 to be compared with the stored value in the corresponding memory address accesses by the adder signal.

In response to the actuation signal produced in the second code comparator 38, a monostable multivibrator 53 is triggered to feed an output signal to the actuator 55 via an inverter 54 to activate the actuator for unlocking the door. Likewise, the actuation signal is fed to an AND gate 57. The other input terminal of the AND gate is connected to a monostable multivibrator 56. The monostable multivibrator 56 is responsive to the output of the push button switch 21*b* which is depressed following to inputting of the second code. The monostable multivibrator 56 feeds the output to the AND gate 57 to establish the AND condition. The AND gate 57 produces an AND signal when the AND condition is established. In this manner, actuator 58 for the window regulator (not shown) is activated to open the vehicle window. When the trunk lid is to be unlocked, the push button switch 21*c* is depressed following to inputting of the second code. The signal of the push button 21*c* is fed to a monostable multivibrator 59 for triggering the latter to feed a signal to an AND gate 60. At the same time, the actuation signal from the second code comparator 38 is fed to the AND gate 60. When the AND condition of the input signal of the push button switch 21*c* and the actuation signal of the second code comparator 38 is established, the AND gate 60 produces an AND signal to activate the actuator 61 for unlocking the trunk lid.

In FIG. 2, an actuator 52 is adapted for automatic locking of the vehicle door. The actuator 52 is responsive to the input signal of the push button switch 21*a* inputted following to inputting of the second code. The input signal of the push button switch 21*a* is fed to one of the input terminals of an AND gate 49. The other input terminal of the AND gate 49 is connected to a sensor E detecting a preselected vehicle condition for door locking. For example, the preselected door locking factor may be the ignition switching being turned off, the key being not detected in the key cylinder, and so on. When the AND condition is established, the AND signal triggers a monostable multivibrator 50 to activate the actuator 52 for locking the vehicle door.

The actuation signal of the second code comparator 13 is also fed to one input terminal of an AND gate 30. The other input terminal of the AND gate 30 is connected to an address signal counter 33. The address signals counter 33 counts up the address signal and produces an output fed from the corresponding output terminal. The AND gate 30 is connected to the On terminal of the address signal counter to receive the On signal when the counted value therein reaches a preselected value n. This value is variably selected by the operators choice of the number of elements in the second code, e.g., $n=5 (n \leqq 7)$. The n value is preset to the counter 33 by means of input lines H. When the On signal and actuation signal are both present, an AND condition is established, and, the AND gate 30 produces an AND signal to be fed to one of the input terminals of an OR gate 29. Another input terminal of the OR gate 29 is connected to an AND gate 31. The AND gate 31 is connected to the On terminal of the address signal counter 33 and the output terminal of the flip-flop 46 of the first code comparator 12. Therefore, the AND gate 31 outputs an AND signal when the On signal and the output of the first code comparator 12 is established. The other input terminal of the OR gate 29 is connected to an AND gate 32 which is in turn, connected to the seventh terminal $o_7$ of the address signal counter 33 at one input terminal and the output terminal of the flip-flop 46 of the first code comparator 12. Therefore, the AND gate 32 produces an AND signal when the seventh terminal of the address signal counter 33 has output and the flip-flop output establish the AND condition.

The OR gate 29 is connected to the reset terminal of the counter 27 of the address signal generator 11 through an OR gate 28. The other input terminal of the OR gate is connected to the one-shot monostable multivibrator serving as a delay for producing the rest signal via an OR gate 26 with a given delay time. A power reset circuit 24 is connected to the OR gate 26. The power reset circuit is turned on in response to turning the power on for initializing the system.

Although not shown in the embodiment of FIG. 2, the flip-flop 44 of the second code comparator may also have a reset output terminal for feeding a reset signal for resetting the whole system when the inputted code is different from the stored second code.

Upon resetting of the address counter 27, the code element number presetting circuit 19 is responsive to register the number of the code elements inputted thereto.

Figure 4:
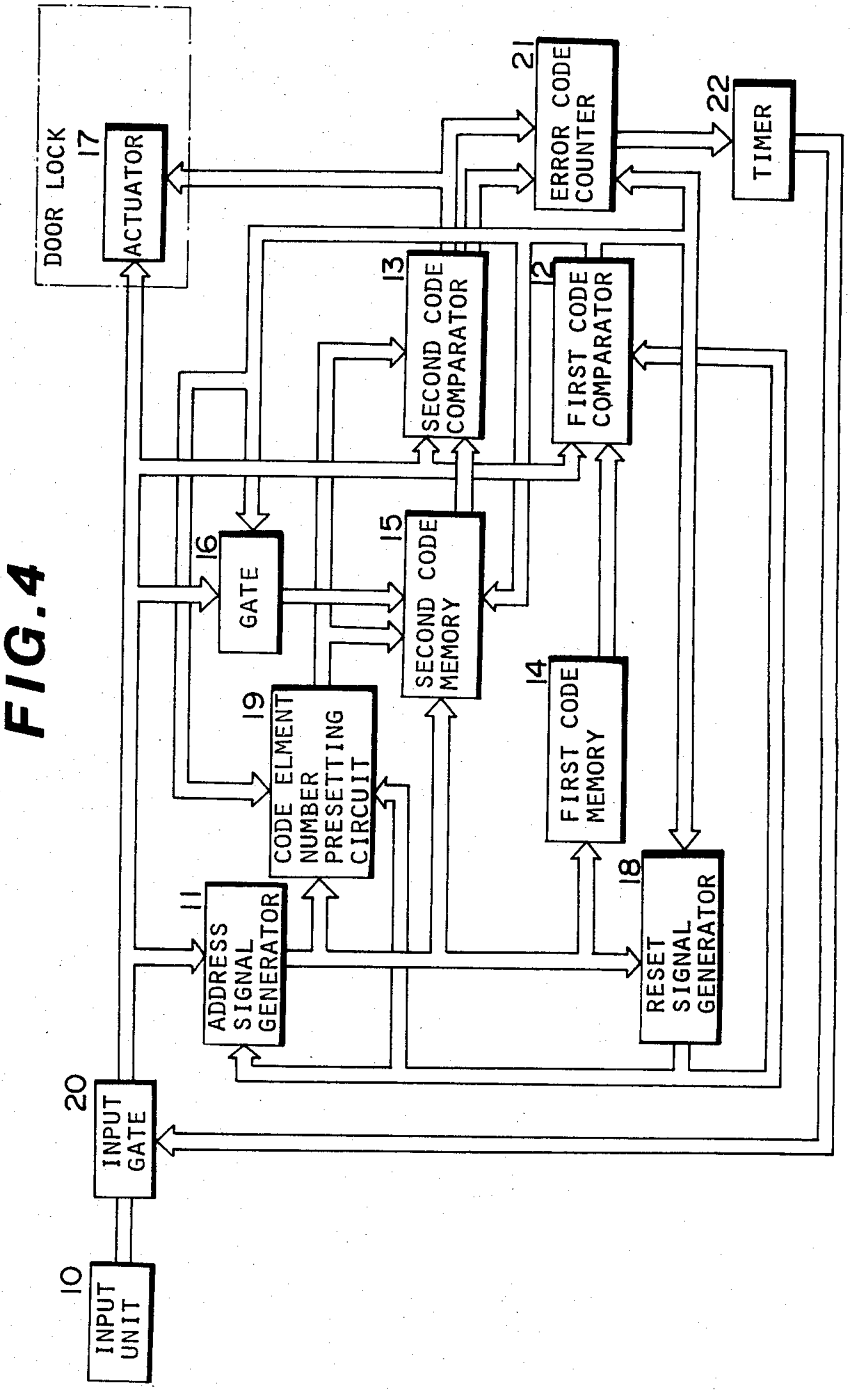
FIG. 4 is a schematic block diagram of the keyless entry system as modification or another embodiment of the present invention.

FIG. 4 shows a modification of the foregoing preferred embodiment of the present invention. As apparent from FIG. 3, the modified keyless entry system includes an input gate circuit 20. The input gate circuit is connected to a timer 22. The timer 22 is associated with an error code counter 21. The error code counter 21 counts an error signal produced by the second code comparator 13 when the inputted code is different from the second code. The error code counter 21 produces a counter output when the counter value reaches a predetermined value to activate the timer 22. The timer 22 feeds a timer signal to the input gate 20 for a given period. As long as the timer signal is inputted, the input gate circuit 20 inhibits the code element signals inputted to the input unit 10 to pass therethrough.

The input gate circuit 20, the timer 22, and the error code counter 21 may constitute a theft preventing circuit 22 in the foregoing embodiment of FIG. 2. By this, theft of the vehicle by inputting a plurality of codes for accidentally matching the correct first or second code is prevented.

What is claimed is:

1. A keyless entry system for unlocking an automotive door lock in use with a code inputted thereto, which comprises:

an input unit for inputting an input code;

a first memory means for storing a first code;

a second memory means for storing a second code having a given number of code elements, the number being variable in a range limited by a predetermined maximum number; and a third means, responsive to an inputted first code through said input unit, for enabling variation of said second code and for varying said number of code elements, said third means being adapted to record the varied second code in said second memory means.

2. A keyless entry system for an automotive vehicle comprising:

a door unlocking actuator for unlocking a door lock of a vehicle door;

an input unit for inputting an input code;

a first memory means for storing a first code;

a first means for comparing said input code with said first code for producing a first signal when said input code matches said first code;

a second memory means for storing a second input code of variable length, said second code stored in said second memory means, said second memory means operable in response to said first signal for storing, as an updated second code, further input code inputted subsequently to said first signal, said second memory being operable for storing second codes updated both with respect to specific digits forming code elements thereof and with respect to the number of said digits;

second means for comparing said input code with said second code stored in said second memory means and producing an actuation signal for activating said door unlocking actuator for unlocking said door lock when said input code matches said second code; and third means, associated with said second memory means, for counting the number of digits of said second code for controlling writing and reading of said second code in said second memory.

3. A keyless entry system for an automotive vehicle comprising:

a door unlocking actuator for unlocking a door lock of a vehicle door;

an input unit for inputting an input code;

a first memory means for storing a first code comprising a first number of code elements;

first means for comparing said input code with said first code and producing a first signal when said input code matches said first code;

a second memory means for storing a second code comprising a second number of code elements, said second code stored being variable in response to said first signal to vary a combination of code elements forming said second code and to vary said second number;

second means for comparing said input code with said second code and for producing a second signal for activating said door unlocking actuator for unlocking said door lock when said input code matches said second code; and third means, associated with said second memory means for counting the number of code elements of said second code for controlling reading of said second code in said second memory means.

4. A keyless entry system for an automotive vehicle comprising:

a door unlocking actuator for unlocking a door lock of a vehicle door;

an input unit positioned on the exterior of a vehicle for external operation for inputting an input code;

a first memory means for storing a first code;

first means for comparing said input code with said first code and producing a first signal when said input code matches said first code;

a second memory means for storing a second code including a given number of code elements, said second memory means having a read and write mode wherein said second code stored therein is readable and writable as a replacement of the previously stored second code, said second memory means being responsive to said first signal to change the mode thereof from said read mode to said write mode for inputting a new second code having a different number of code elements;

second means for comparing said input code with said second code and producing a second signal for activating said door unlocking actuator for unlocking said door lock when said input code matches said second code; and third means, associated with said second memory means, for counting the number of code elements of said second code and recording the number of code elements of said second code stored in said second memory means, said third means being responsive to said first signal for resetting the recorded value therein for controlling the reading of said second code in said second memory means.

5. A keyless entry system for an automotive vehicle comprising:

a door unlocking actuator associated with a door lock provided in a vehicle door for unlocking said door lock;

an input unit including a plurality of push buttons respectively adapted to produce different values of input signals respectively indicative of values of inputted code elements of an input code;

an address signal generator, associated with said input unit and responsive to said input signals for producing address signals;

a first memory means for storing a first code comprised of a plurality of code elements, each of said code elements being stored in a corresponding address in said first memory means and read out upon access by said address signals;

first means for comparing each of the inputted code elements with a corresponding code element of said first code stored in the corresponding address in said first memory means and producing a first signal when all of said inputted code elements match the corresponding code elements of said first code;

a second memory means for storing a second code comprised of a given number of code elements stored in respective addresses therein, said second memory means being accessed by said address signals for reading out the code elements stored therein, said second memory means being responsive to said first signal for varying the combination of code elements of said second code and for varying said given number of code elements;

second means for comparing the inputted code elements with the corresponding code elements of said second code and producing a second signal for activating said door unlocking actuator for unlocking said door lock when said input code matches with said second code, and a reset signal for resetting and initializing the system otherwise; and third means, associated with said second memory means and responsive to said first signal, for counting the number of digits forming said second code and recording the same for controlling the writing of said second code in said second memory means.

6. The keyless entry system as set forth in any one of claims 1 to 5, wherein said third means produces a third signal representative of the recorded number of code elements of the second code stored in said second memory means, and said second memory means is responsive to said third signal under a read out mode for permitting reading out of the second code.

7. The keyless entry system as set forth in anyone of claims 1 to 4, which further includes an address signal generator responsive to signals fed from said input unit and producing address signals to access said first and second memory means for reading out stored first and second code.

8. The keyless entry system as set forth in claim 7, wherein said address signal generator includes a counter for counting up the number of signals inputted from said input unit and an address signal produced therein represents the order of access in said first and second memory means.

9. The keyless entry system as set forth in claim 8, which further comprises a reset signal generator for producing a counter reset signal for resetting said counter in said address signal generator, which reset signal generator is responsive to said first signal to produce said counter reset signal with a given delay time.

10. The keyless entry system as set forth in claim 9, wherein said third means is responsive to said counter reset signal for starting the counting up of the inputted code elements after said counter reset signal.

11. The keyless entry system as set forth in claim 10, wherein said second memory means is placed in a write mode for writing therein the second code in response to said counter reset signal, said new second code inputted following said counter reset signal.

12. The keyles entry system as set forth in claim 11, which further comprises a theft preventing circuit which inhibits input of said input code when the time between occurrence of said input code elements exceeds a predetermined time.

13. The keyless entry system as set forth in claim 12, wherein said theft preventing system comprises fourth means incorporated with said second means for producing a fourth signal indicating said input code being different from said second code, a counter for counting up said fourth signal and producing a fifth signal when the counter value exceeds a given value, a timer responsive to said fifth signal for producing a timer signal having a given duration and a gate associated with said input unit and responsive to said timer signal to close the gate for inhibiting input of said input code as long as said timer signal is present.

14. A keyless entry system for unlocking an automotive door lock in use with a code inputted thereto, which comprises:

an input unit for inputting an input code comprised of a plurality of code elements;

a first memory for storing a first code;

a second memory for storing a second code comprised of a variable number of code elements;

varying means, responsive to an inputted first code, for varying said second code to be stored in said second memory and for varying said number of code elements comprising said second code, said varying means being adapted to record said number of code elements of said second code stored in said second memory.

* * * * *